United States Patent
Griess

(10) Patent No.: US 6,563,820 B1
(45) Date of Patent: May 13, 2003

(54) PROCESS AND DEVICE FOR FORWARDING NON SPEECH-BOUND INFORMATION

(75) Inventor: Rainer Griess, Meerbusch (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/051,362

(22) PCT Filed: Oct. 10, 1996

(86) PCT No.: PCT/DE96/01984

§ 371 (c)(1),
(2), (4) Date: Apr. 8, 1998

(87) PCT Pub. No.: WO97/14254

PCT Pub. Date: Apr. 17, 1997

(30) Foreign Application Priority Data

Oct. 11, 1995 (DE) .......................................... 195 39 404
Oct. 11, 1995 (DE) .......................................... 195 39 406

(51) Int. Cl.$^7$ .............................. H04J 3/16; H04L 12/28
(52) U.S. Cl. .................................. 370/389; 370/437
(58) Field of Search ................................. 370/431, 437, 370/447, 535, 351–356, 328, 338, 401–329, 389, 392, 349, 310.2, 313, 474; 455/507, 509, 433, 560, 158.1, 179.1, 414

(56) References Cited

U.S. PATENT DOCUMENTS

| | | | | |
|---|---|---|---|---|
| 4,392,222 A | * | 7/1983 | Ando | 370/352 |
| 4,611,322 A | * | 9/1986 | Larson et al. | 370/352 |
| 4,964,119 A | * | 10/1990 | Endo et al. | 370/237 |
| 5,343,467 A | * | 8/1994 | Wohr | 370/352 |
| 5,533,019 A | * | 7/1996 | Jayapalan | 370/352 |
| 5,537,610 A | * | 7/1996 | Mauger et al. | 455/414 |
| 5,550,822 A | * | 8/1996 | Ikeda | 370/426 |
| 5,590,133 A | * | 12/1996 | Billstrom et al. | 370/349 |
| 5,604,788 A | * | 2/1997 | Tett | 379/58 |
| 5,742,905 A | * | 4/1998 | Pepe et al. | 455/461 |
| 5,752,188 A | * | 5/1998 | Astrom et al. | 455/433 |

* cited by examiner

Primary Examiner—Chau Nguyen
Assistant Examiner—Andy Lee
(74) Attorney, Agent, or Firm—Cohen, Pontani, Lieberman & Pavane

(57) ABSTRACT

The invention relates to a process and a device for forwarding non-speech-bound information between a mobile communications network and any other communications network. To allow data packets data to be sent, regardless of its receiver address, to the involved communications network, the transmission route for the forwarding of the information is established as a function of the identification code of the data packet one logical transmission channel is assigned to each identification code, and each logical transmission channel is bound to exactly one physical transmission channel. For this purpose, an identification code is assigned to each incoming logical transmission channel. The logical transmission channels from the mobile communications network then are permanently connected to selected outgoing physical transmission channels to different communications networks. At least one logical transmission channel coming from the mobile communications network can be assigned to each outgoing physical transmission channel which is connected to a communications network.

3 Claims, 1 Drawing Sheet

PROCESS AND DEVICE FOR FORWARDING NON SPEECH-BOUND INFORMATION

BACKGROUND OF THE INVENTION

1. Field of the Invention

The present invention relates to a process and a device for forwarding non-speech-bound information between a mobile communications network and one or more other communications networks.

2. Description of the Prior Art

Known mobile communications networks are structured in accordance with, for example, the Global System for Mobile Communication (GSM) Specification. In the framework of the GSM Specification, a so-called Short Message Service (SMS) is provided for, which allows text information with a maximum length of 160 characters to be sent from one subscriber to another subscriber. This text information is transmitted in the form of a data packet. Under the GSM Specification, each data packet comprises an identification code, a receiver address and a message, which contains the text information. The data packets are managed in a service center known as the Short Message Service Center (SMSC). Such management involves, for example, sharing a message directed to a subscriber not currently registered in the mobile communications network until the addressed subscriber registers in the mobile communications network and the message thus becomes deliverable.

However, it is considered disadvantageous that each Short Message Service of this type is limited to one specific mobile communications network structured in accordance with the GSM Specification.

Moreover, the desire exists to exchange short messages with the subscribers of networks that do not comply with the GSM Specification, such as a personal computer that can access an electronic mail box or is itself the medium for an electronic mail box or other service.

Devices for packet switching for this purpose are known in principle from the "Principles and Embodiments of Digital Switching" ["*Prinzipien und Ausführungsformen digitaler Vermittlungen*"] by P. R. Gerke in *Nachrichtentechnik-Electronik,* Berlin 35 (1985) 2, pp. 47–48. Such devices have a plurality of logical interfaces for incoming and outgoing transmission channels, and each incoming transmission channel can be temporarily connected to each outgoing transmission channel.

It is thereby assumed that each packet carries its destination address. When such a packet is switched, its destination address is analyzed, and the packet is conveyed to the addressed subscriber.

Under the GSM Specification, a short message consists of a predeterminable identification code, a receiver address (representing the destination address) and the message. The problem is that the receiver address represents the destination address of the subscriber in the particular network to which the subscriber belongs, but gives no information about which network the short message should be conveyed to. This means that identical receiver addresses for different communications networks may exist parallel to each other, so that the receiver address is unsuitable as an allocation criterion.

SUMMARY OF THE INVENTION

The object of the invention is therefore to provide a process, and a device for implementing the process, for forwarding non-speech-bound information which allow a data packet to be exchanged between a mobile communications network and at least any one other communications network, whereby the information is conveyed to the relevant communications network independent of the receiver address.

According to the invention, this object is attained by establishing a function of an identification code of a data packet and routing the data packet to a logical transmission channel assigned to the function of the identification code, wherein each logical transmission channel is bound to a specific physical transmission channel.

The invention includes assigning an outgoing non-voice-bound information from the mobile communications network to a logical transmission channel. An identification code is assigned to each logical transmission channel on the mobile communications network side. Since this identification code forms part of the data packet of the message during forwarding, the data packet containing the non-voice-bound information can be assigned to a logical transmission channel with a matching identification code.

Each predeterminable logical transmission channel coming from the mobile communications network is permanently connected to a selected outgoing physical transmission channel to another communications network.

Because one identification code is assigned to each logical transmission channel connected with the mobile communications network and because each logical transmission channel coming from the mobile communications network is permanently connected to an outgoing logical transmission channel in a physical transmission channel to a different communications network, it is possible for every data packet to be forwarded to the correct communications network regardless of its network-specific receiver address.

In addition, a specific functionality or service can be assigned to each identification code, permitting the individualized management of the subscriber-specific use of different services.

Furthermore, one or more logical transmission channel coming from the mobile communications network can be assigned to each outgoing physical transmission channel to a different communications network. An outgoing physical transmission channel to a different communications network can be configured with a plurality of logical transmission channels, which are selectable in time multiplex.

Systematically, the essence of the invention is to convert the GSM-specific space/time multiplex into a plurality of spatially separated communication-network-specific time multiplexes by means of an information-type-selective space multiplex.

Advantageously, a plurality of differentiated short message types representing different services can thus be forwarded via a single other communications network and nonetheless managed in a differentiated fashion.

DETAILED DESCRIPTION OF THE PREFERRED EMBODIMENTS

Figure 1:
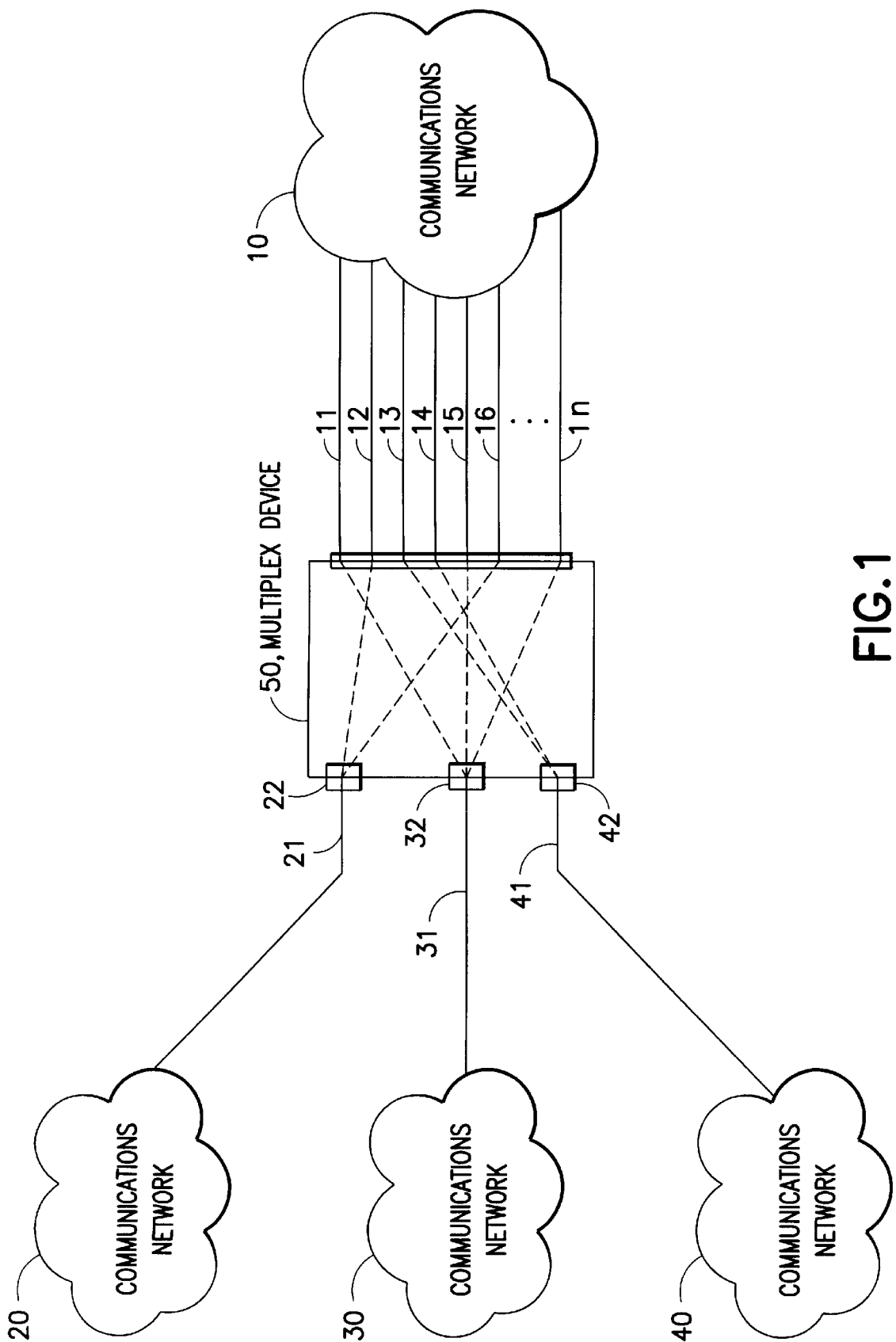
FIG. 1 is a schematic diagram showing the device for forwarding non-voice-bound information between a mobile communications network and other communications networks according to the invention.

The invention is described in greater detail below in reference to an example. FIG. 1 shows, in schematic fashion, a multiplex device 50 for forwarding non-voice-bound information between a mobile communications network 10 and other communications networks 20, 30 and 40. The non-voice-bound information is part of a data packet to be transmitted by the mobile communications network 10. The data packet also contains and identification code and a received address. The identification code indicates a particular function or service associated with the data packet and the receiver address represents a destination address. Coming from the mobile communications network 10 and connected to multiplex device 50 via input connection 52 are n logical transmission channels 11 to 1n. The other communications networks 20, 30 and 40 are connected to the multiplex device 50 via input connection 22, 32, and 42 by respective physical transmission channels 21, 31 and 41, each of which can have a plurality of logical transmission channels.

For example, let the communications network 20 be the Datex-P network, the communications network 30 the Integrated Services Digital Network (ISDN), and the communications network 40 the Internet.

Each logical transmission channel 11 to 1n coming from the mobile communications network 10 is associated with a specific functionality or service. To operate each specific service, a service center is attached to a different communications network 20, 30 or 40.

The service may include an information system that responds to inquiries, an announcement service or an emergency service. In addition, the service can unidirectionally transmit call signals (with message linking, if needed) to mobile call signal receivers and be embodied as a so-called "City Call" service.

These services an others can be searched for by a subscriber of the mobile communications network 10, whereby the establishment of the connection for the purpose of data exchange is initiated by the mobile communications network 10. However, it is also possible to search for such services from one of the different communications networks 20, 30 or 40. If the connection is switched in virtual fashion, bidirectional data exchange is possible. For other services which come from a different communications network 20, 30 or 40 and in the case of which the connection establishment is initiated by the given communications network 20, 30 or 40, the destination address is the same as the receiver address of the subscriber in the called mobile communications network 10, which is the phone number of the called subscriber.

Each logical transmission channel 11 to 1n coming from the mobile communications network 10 is connected to one of the physical transmission channel 21, 31 and 41 with are respectively connected to the different communications networks 20, 30 and 40. A plurality of the incoming logical transmission channels 11 to 1n can thereby be assigned to each outgoing physical transmission channel 21, 31 and 41. For example, in FIG. 1 the incoming logical transmission channels 12 and 16, via which services are provided whose service center is a subscriber of the Datex-P network 20, are assigned to the physical transmission channel 21 going to the Datex-P network 20. Furthermore, the incoming logical transmission channels 11, 15 and 1n, via which services are provided whose service center is a subscriber of the ISDN network 30, are permanently assigned to the outgoing physical transmission channel 31 to the ISDN network 30. Finally, the incoming logical transmission channels 13 and 14 are connected permanently, via the multiplex device 50 for forwarding non-speech-bound information, to the physical transmission channel 41, which provides the connection to the Internet 40.

Furthermore, each of the communications networks 20, 30 and 40 may comprise a plurality of service centers, each of which is selectable via its receiver address, which is part of the data packet.

Advantageously, even if there is a change in the association of the service centers with the respective communications networks 20, 30 and 40, the use of the services by subscribers in the mobile communications network 10 is completely transparent, because the identification code for the service is maintained. When such a change in the association of the service centers occurs, the multiplex device 50 for forwarding non-speech-bound information may assign the relevant logical transmission channels 1n to the one of the physical channels 21, 31, or 41 connected to another currently relevant one of the communications networks 20, 30, or 40.

What is claimed is:

1. A process for forwarding a data packet including non-speech-bound information between a mobile communications network and another communications network, wherein the data packet comprises an identification code indicating a service associated therewith, a receiver address, and the non-speech bound information, comprising the steps of:

assigning a specific service having a specific identification code to each one of a plurality of logical transmission channels connected to the mobile communications network;

connecting each one of the plurality of logical transmission channels to one of a plurality of physical transmission channels that is connected to a communications network with a service center associated with the specific service assigned to the each one of the plurality of logical transmission channels; and establishing a transmission route for the forwarding of the data packet by selecting a selected logical transmission channel from one of the plurality of logical transmission channels in response to the identification code of the data packet thereby ensuring that the data packet is forwarded to a relevant communications network.

2. A multiplex device for forwarding a data packet including non-speech bound information between a mobile communications network and one of first and second other communications networks, wherein said data packet comprises an identification code, a receiver address, and the non-speech-bound information, the multiplex device comprising:

means for receiving a plurality of logical transmission channels connected to the mobile communications network, each said plurality of logical transmission channels having a specific identification code;

means for receiving first and second physical transmission channels respectively connected to the first and second other communications networks, the first other communications network comprising a first service center associated with a first identification code and the second other communications network comprising a second service center associated with a second identification code;

said first physical transmission channel being connectable with said second physical transmission channel and each of said plurality of logical transmission channels being connectable to one of said first and second physical transmission channels; and multiplex means for connecting a selected one of the plurality of logical transmission channels to the first physical transmission channel if the specific identification code of the selected logical transmission channel is a first identification code and connecting the selected logical transmission channel to the second physical transmission channel if the specific identification code of the selected logical transmission channel is a second identification code thereby ensuring that the data packet forwarded on the selected one of the plurality of logical transmission channels is forwarded to a relevant one of said first and second other communications networks.

3. A multiplex device for forwarding a data packet including non-speech-bound information between a mobile communications network and one of first and second other communications networks, wherein said data packet comprises an identification code, a receiver address, and the non-speech-bound information, the multiplex device comprising:

a first input connection receiving a plurality of logical transmission channels connected to the mobile communications network, each said plurality of logical transmission channels having a specific identification code;

a second input connection receiving a first physical transmission channel connected to the first other communications network and a third input connection receiving a second physical transmission channel connected to the second other communications network, the first other communications network comprising a first service center associated with a first identification code and the second other communications network comprising a second service center associated with a second identification code;

said first physical transmission channel being connectable with said second physical transmission channel and each of said plurality of logical transmission channels being connectable to one of said first and second physical transmission channels; and a multiplexer for connecting a selected one of the plurality of logical transmission channels to one of the first physical transmission channel and the second physical transmission channel in response to the specific identification code of the selected logical transmission channel and thereby ensuring that the data packet forwarded on said selected one of the plurality of logical transmission channels is forwarded to a relevant one of said first and second other communications networks.

* * * * *